(12) United States Patent
Aslanian et al.

(10) Patent No.: US 11,236,608 B2
(45) Date of Patent: Feb. 1, 2022

(54) METHOD FOR INJECTIVITY PROFILING OF INJECTION WELLS

(71) Applicant: Limited Liability Company "Termosim", Kazan (RU)

(72) Inventors: Artur Mikhailovich Aslanian, Kazan (RU); Dmitry Aleksandrovich Davydov, Kazan (RU); Andrey Nikolaevich Salamatin, Kazan (RU)

(73) Assignee: Limited Liability Company "Termosim", Kazan (RU)

( * ) Notice: Subject to any disclaimer, the term of this patent is extended or adjusted under 35 U.S.C. 154(b) by 534 days.

(21) Appl. No.: 16/323,035

(22) PCT Filed: Sep. 12, 2017

(86) PCT No.: PCT/RU2017/050087
§ 371 (c)(1),
(2) Date: Feb. 4, 2019

(87) PCT Pub. No.: WO2018/164604
PCT Pub. Date: Sep. 13, 2018

(65) Prior Publication Data
US 2019/0162065 A1 May 30, 2019

(30) Foreign Application Priority Data

Mar. 10, 2017 (EA) .................. 201700129

(51) Int. Cl.
*E21B 49/00* (2006.01)
*E21B 47/07* (2012.01)
*E21B 47/103* (2012.01)
*G01N 15/08* (2006.01)

(52) U.S. Cl.
CPC ............ *E21B 49/008* (2013.01); *E21B 47/07* (2020.05); *E21B 47/103* (2020.05); *G01N 15/082* (2013.01)

(58) Field of Classification Search
CPC .......................... E21B 40/008; G01N 15/082
See application file for complete search history.

(56) References Cited

U.S. PATENT DOCUMENTS

| 3,709,032 | A | 1/1973 | Coles, Jr. et al. | |
| 7,536,905 | B2 | 5/2009 | Jalali et al. | |
| 2006/0293857 | A1* | 12/2006 | Moos | G01V 1/005 702/12 |
| 2019/0338621 | A1* | 11/2019 | Jin | E21B 43/00 |
| 2021/0238972 | A1* | 8/2021 | Jin | E21B 47/107 |

FOREIGN PATENT DOCUMENTS

| CA | 2114456 C * | 8/2004 | ............. E21B 43/24 |
| RU | 2130543 | 5/1999 | |
| RU | 2580547 | 4/2016 | |

OTHER PUBLICATIONS

Pimenov et al. "Injectivity Profiling in Horizontal Wells Through Distributed Temperature Monitoring," SPE 97023 (Year: 2006).*

* cited by examiner

*Primary Examiner* — John Fitzgerald
(74) *Attorney, Agent, or Firm* — Boyle Fredrickson S.C.

(57) ABSTRACT

This invention relates to the oil and gas production industry and can be used in geophysical surveys of horizontal and deviated (including vertical) wells for their injectivity profiling and assessment of total fluid loss into the lower zone of a target interval, inaccessible for survey, and below the bottom hole.

The proposed technology can be used in the presence of both behind-casing and wellbore cross-flows.

5 Claims, No Drawings

METHOD FOR INJECTIVITY PROFILING OF INJECTION WELLS

TECHNICAL FIELD

This invention relates to the oil and gas production industry and can be used in geophysical surveys of horizontal and deviated (including vertical) wells for their injectivity profiling and assessment of total fluid loss into the lower zone of a target interval, inaccessible for survey, and below the bottom hole.

As distinguished from direct injection profiling methods applied to perforated intervals, the proposed technology can be used in the presence of both behind-casing and wellbore cross-flows.

BACKGROUND ART

The prior art closest to the proposed technology is represented by inventions described in patents U.S. Pat. No. 3,709,032 A (SHELL OIL CO, US; published on 9 Jan. 1973, IPC E21647/10) and U.S. Pat. No. 8,146,656 B2 (SCHLUMBERGER TECHNOLOGY CORPORATION, US; published on 24 Nov. 2011, IPC E21647/00).

The essence of the first method (U.S. Pat. No. 3,709,032 A) is that a certain amount of fluid of known average temperature, different from that in the survey interval of a reservoir formation, is injected into this interval over a relatively short period of 2 to 12 hours to profile the temperature recovery rate after injection and use acquired data to determine the injectivity profile.

The principal drawback of this method is the complexity of its implementation by the generation of an injection heat pulse using a certain amount of fluid of known temperature.

The second injectivity profiling method (U.S. Pat. No. 8,146,656 B2) requires shutting in an injection well to heat up the fluid in its upper (vertical) section, then resuming injection and evaluating decrease in heat perturbation propagation velocity in the wellbore using distributed temperature sensing systems.

The need to control the evolution and propagation rate of the temperature front as well as the complexity of this phenomenon substantially limit the application of the method and the reliability of the interpretation of acquired geophysical logging data.

ESSENCE OF THE INVENTION

The solution offered by the proposed method and the achieved technical result consist in the creation of a universal, consistent approach to geophysical logging in injection wells and the development of a generalised methodology to interpret temperature data for reliable and accurate injection profiling under various, including complicated, oilfield conditions.

As distinguished from direct injection profiling methods applied to perforated intervals, the proposed technology can be used in the presence of both behind-casing and wellbore cross-flows.

Along with reservoir injectivity profiling, the method enables the assessment of total fluid loss into the lower zone of a target interval, inaccessible for survey, and below the bottom hole as the difference between the total injection volume and the amount of fluid lost into the surveyed formations.

As distinguished from the method described in U.S. Pat. No. 3,709,032, the proposed invention can use natural (for instance, daily) variations in injection fluid temperature, and formation temperature perturbation through the injection of fluid heated in the wellbore (similarly to the method described in U.S. Pat. No. 8,146,656 B2) during shut-in does require recording the shape and speed of temperature perturbation propagation along the wellbore upon injection of a specified volume of warm fluid.

According to the proposed invention, any reservoir temperature perturbation mode implies that well logging data are interpreted using an improved formula that is an exact solution to a heat pulse relaxation problem under the assumptions described in U.S. Pat. No. 3,709,032 or using a simulator, which substantially improves the reliability of injectivity profiling.

The formula claimed in U.S. Pat. No. 3,709,032 is valid only over a long well shut-in time substantially exceeding the duration of a heat pulse when residual temperature perturbations become vanishingly small and are impossible to interpret reliably.

The approximate evaluation formulae given below can be used to plan an experiment and pre-process measurement data.

Stricter organisation of well logging and more reliable interpretation of acquired data require common use of up-to-date, high-precision thermohydrodynamic simulators to account for the heterogeneity of host and reservoir rocks, thermodynamic properties of injected fluid, non-stationarity and other features of hydrodynamic processes in reservoir formations, including cross-flows between them, and heat exchange in the well, surrounding rocks and reservoir formation.

DISCLOSURE OF INVENTION

This description defines "a heat pulse" as a heat pulse generated naturally or artificially unless stated otherwise.

The proposed general principle of well injection profiling is based on the use of a controlled heat perturbation pulse in reservoir formations with subsequent measurement of its relaxation in time after well shut-in.

A pulse is generated either by natural daily variations of injection fluid temperature or by its artificial variation over a specified time interval.

One of the main characteristics of such a pulse is the depth of penetration of temperature perturbations into the reservoir, i.e. the radius of investigation within which the injectivity profile of a reservoir formation is determined.

In one of the embodiments of the invention, a heat pulse is generated and controlled in the following way.

When injecting fluid with daily wellhead temperature variations, temperature perturbation naturally occurs in the near-wellbore region if the amplitude of wellhead temperature variation remains above a certain level ensuring that temperature measurements have the proper resolution and are accurately interpreted.

The damping of daily temperature variations in the wellbore depends on its design, depth, fluid injection rate and thermophysical properties of surrounding rocks.

Maintenance of stable injection and temperature variations at the wellhead for a specified period before an experiment is an important condition for the survey.

For this purpose, fluid temperature is measured during injection directly above the reservoir or at the wellhead if wellbore temperature variation is predicted with sufficient accuracy.

A well should be shut-in for two to three hours after reaching the maximum or minimum bottom-hole temperature, when the most homogeneous positive or negative daily temperature perturbation is completely generated in the near-wellbore region.

If no direct measurements are made during the heat pulse formation period, the daily bottom-hole temperature variation can be reconstructed using a thermohydrodynamic simulator and reliable input data, but this can make shut-in temperature data interpretation less accurate.

Another alternative embodiment of the invention with no daily variation of injection fluid temperature suggests the following way of formation and control of an artificial heat pulse.

To create a heat pulse, a well is shut in for some time for partial relaxation of wellbore and rock temperature towards the natural geothermal temperature and a certain amount of warm fluid is then injected into the reservoir.

The shut-in time is normally one day.

The minimum shut-in time to provide the well temperature relaxation degree is calculated by Formula (1):

$$t_w = 0.32 \cdot t_f^\alpha \left( \frac{\langle a \rangle}{r_w^2} \right)^{\alpha - 1} \qquad (1)$$

where is $\langle a \rangle$ the average thermal conductivity of rocks, $r_w$—borehole radius, $t_f$—duration of continuous operation of a well before injection, α—wellbore temperature relaxation degree (recommended α~value: 0.35-0.4)

Well shut-in time can be increased, along with the total volume of warm fluid available for the next injection.

The injection pulse duration $t_p$ during which a well operates at the total flow rate Q is determined by Formula (2):

$$t_p = \frac{\pi r_w^2 c_w Q_0 H \left( 0.013 \cdot \left( \frac{2\pi \langle \lambda \rangle H}{c_f Q} \right)^{2.16} + 0.18 \right)}{c_f Q^2} \qquad (2)$$

where $\langle \lambda \rangle$ is the average thermal conductivity of rocks, $c_f$—volumetric specific heat capacity of fluid, $Q_0$—normalisation flow rate of about 200 m3/d, $c_w$—average volumetric heat capacity of the wellbore, H—top depth of the upper receiving reservoir.

During pulse formation, the injection flow rate must be stable for several days before well shut-in, and pulse characteristics—duration, injection volume and reservoir penetration radius—must be known.

For this purpose, temperature is measured during injection before shut-in in the wellbore or at the wellhead if wellbore temperature variation is predicted with sufficient accuracy.

Wellbore temperature is also measured after the first shut-in period when the wellbore fluid heats up.

To control a pulse during fluid injection, wellbore temperature is measured above the top of a reservoir formation or within its interval.

If one or more of these requirements are not met, the sequence of measurements can be reconstructed using a thermohydrodynamic simulator but with less reliable interpretation results.

Another alternative embodiment of the invention suggests that an artificial heat pulse is generated and controlled by changing the injection rate, increasing it in wells with low injection volumes and decreasing it in those with high injection volumes.

This correspondingly decreases or increases the bottom-hole flow temperature for a period necessary to form temperature perturbations in reservoirs.

The injection pulse duration $t_p$ during which a well operates at the average changed flow rate Q is determined by Formula (3):

$$t_p = \frac{\pi r_w^2 c_w Q_0 H \left( 0.013 \cdot \left( \frac{2\pi \langle \lambda \rangle H}{c_f Q} \right)^{2.16} + 0.18 \right)}{c_f Q^2} \qquad (3)$$

During formation of an artificial pulse, the well flow rate must be stable for several days before well shut-in, and pulse characteristics—flow rate, injection period and reservoir penetration radius—must be known.

For this purpose, temperature is measured during injection, before and after changing the well flow rate and before shut-in in the wellbore, at the wellhead or at 50-100 m above the reservoir top if wellbore temperature variation is predicted with sufficient accuracy.

The calculation of the duration of an artificial heat pulse and determination of injection fluid volume require control over the radius of investigation, which must be sufficient for reliable injectivity profiling, but does not require the shut-in period to be excessively long when temperature perturbation relaxation would be distorted by vertical conductive heat transfer.

The pulse duration is also related to the required injection rate Q and total measurement time tL counted from the start of an injection pulse, which in turn defines the shut-in temperature measurement time after formation of a heat pulse.

After formation of a natural or artificial pulse in a reservoir formation, the temperature response is measured in the well under shut-in conditions.

This is implemented by shutting in the well for time $t_s$ that is sufficient to differentiate temperature perturbations depending on the specific volume of fluid injected into a reservoir and to measure the static temperature Ts(z).

The pulse duration $t_p$, during which perturbation is generated in the reservoir, and flow rate Q depend on the total duration of the planned survey $t_L = t_p + t_s$ and the amount of fluid available to create a heat pulse:

$$t_p = t_L \bigg/ \left( 1 + 0.4 \frac{c_f Q}{4\pi \langle \lambda \rangle h_0} \right) \qquad (4)$$

where $t_p$—is the duration of a perturbation caused by daily temperature variations or the duration of an artificial pulse, $h_0$—effective thickness of receiving reservoirs.

The shut-in period to measure static temperature may vary but this will lower the interpretation accuracy.

Then, the resulting data are interpreted for injectivity profiling.

The resulting temperature data are processed to determine the injectivity profile per reservoir unit q(z) using a thermohydrodynamic simulator that provides accurate modelling or using the simplified formula (5):

$$q(z) = \frac{4\pi\lambda t_s}{c_f t_p} \ln\left(\frac{T_p - T_b}{T_p - T_s(z)}\right) \quad (5)$$

where λ—is the thermal conductivity of a reservoir formation, $T_b$—average injection fluid temperature in a reservoir formation interval, $T_p$—perturbation temperature created in a well by daily variations or by an artificial pulse before shut-in.

In the case of daily variations, a well should be shut in so that a uniform negative or positive pulse forms in the reservoir approximately 2 to 3 hours after the minimum or maximum bottom-hole temperature is reached.

If a simulator is used, an injection profile is selected so as to achieve the best fit between measured and modelled wellbore temperature profiles.

The implementation of the above-mentioned modes and stages of the proposed method has the following limitations:

If a well has been shut in for a long time, it should be put into operation and set in injection mode until the temperature stabilises in the wellbore and reservoir formation;

In the case of wellbore or behind-casing cross-flow, interpretation must be performed using a simulator that models convective heat transfer behind casing;

The simplified formula (5) does not account for boundary effects at the top and bottom of the reservoir;

A survey plan should ensure a balance between the penetration depth of a heat pulse and the resolution of the method, which is inversely proportional to the temperature investigation radius.

It should also be taken into account that a pulse with a large penetration radius increases the accuracy of the survey by minimising the effect of perturbations near the perforations and wellbore;

If a pulse is created by daily temperature variations and well shut-in is not coordinated with maximum temperature perturbations at the bottom hole, the resolution of the injectivity profile substantially decreases;

A lack of measurements (except static) may be compensated by using a simulator if reliable input data are available, but this would reduce the accuracy of the injectivity profile.

The invention claimed is:

1. A method for injectivity profiling of injection wells including:
   formation of a heat pulse in reservoir formations by the injection of fluid of temperature Tp, different from the background injection temperature Tb in a reservoir formation region over time tp;
   shutting in a well for time is that is sufficient to differentiate temperature perturbations depending on the specific volume of fluid injected into a reservoir formation;
   temperature measurement of a residual pulse Ts(z) resulting from temperature stabilisation;
   the resulting temperature data are processed to determine the injectivity profile per reservoir unit q(z) using a thermohydrodynamic simulator that provides accurate modelling or using the following simplified formula:

$$q(z) = \frac{4\pi\lambda t_s}{c_f t_p} \ln\left(\frac{T_p - T_b}{T_p - T_s(z)}\right),$$

where λ—is the thermal conductivity of a reservoir formation, $c_f$—volumetric specific heat capacity of fluid.

2. A method according to claim 1 in which the heat pulse forms through natural daily variations in injection fluid temperature.

3. A method according to claim 1 in which the heat pulse forms through artificial variations in injection fluid temperature over a specified time interval.

4. A method according to claim 3 in which the well is shut in for the subsequent measurement of injection fluid temperature.

5. A method according to claim 3 in which the heat pulse is formed through artificial variations in injection fluid temperature over a specified time interval to measure the temperature of the fluid injected into a reservoir formation.

* * * * *